United States Patent [19]

Bataille

[11] Patent Number: 4,573,543
[45] Date of Patent: Mar. 4, 1986

[54] DOUBLE-SAFETY ARRANGEMENT FOR A SELF-PROPELLED HAND-GUIDED MACHINE

[75] Inventor: Jean M. Bataille, Saint-Valery-en-Caux, France

[73] Assignee: Dynapac AB, Solna, Sweden

[21] Appl. No.: 694,934

[22] Filed: Jan. 25, 1985

[30] Foreign Application Priority Data

Jan. 25, 1984 [DE] Fed. Rep. of Germany ... 8402033[U]

[51] Int. Cl.⁴ ............................................. B60K 29/02
[52] U.S. Cl. ................................. 180/19.1; 180/272; 180/332
[58] Field of Search ................... 180/19.1, 274, 272, 180/315, 332, 336

[56] References Cited

U.S. PATENT DOCUMENTS

| | | | |
|---|---|---|---|
| 3,411,060 | 11/1968 | DePung et al. | 180/19.1 |
| 3,724,586 | 4/1973 | Goodacre | 180/19.1 |
| 3,791,474 | 2/1974 | Stammen et al. | 180/332 |

Primary Examiner—Joseph F. Peters, Jr.
Assistant Examiner—Donn McGiehan
Attorney, Agent, or Firm—Walter Ottesen

[57] ABSTRACT

A double-safety arrangement for a self-propelled, hand-guided machine such as a duplex-vibratory roller equipped with a control column for facilitating control of the machine by an operator. The machine is also equipped with switching linkage actuable for engaging the machine for forward and rearward travel. The linkage has a neutral position to which it returns when no longer actuated for travel and whereat the machine is disengaged and comes to a halt. The double-safety arrangement includes an operating lever having a neutral center position and at least first and second travel positions for forward and rearward travel, respectively. A latching assembly is movable into a latched condition for transmitting the movements of the operating lever to the linkage thereby actuating the latter and into an unlatched condition whereat the linkage means is no longer actuable by the lever. The latching assembly includes a deadman's handle for holding the assembly in the latched condition so long as the handle is held in its actuated position. An override shutoff member provides an override function for bringing the latching assembly into the unlatched condition even while the operator holds the deadman's lever in the actuated position. The override shutoff member can be actuated by the operator, for example, by accidentally falling or when the machine comes into contact with a stationary object.

14 Claims, 7 Drawing Figures

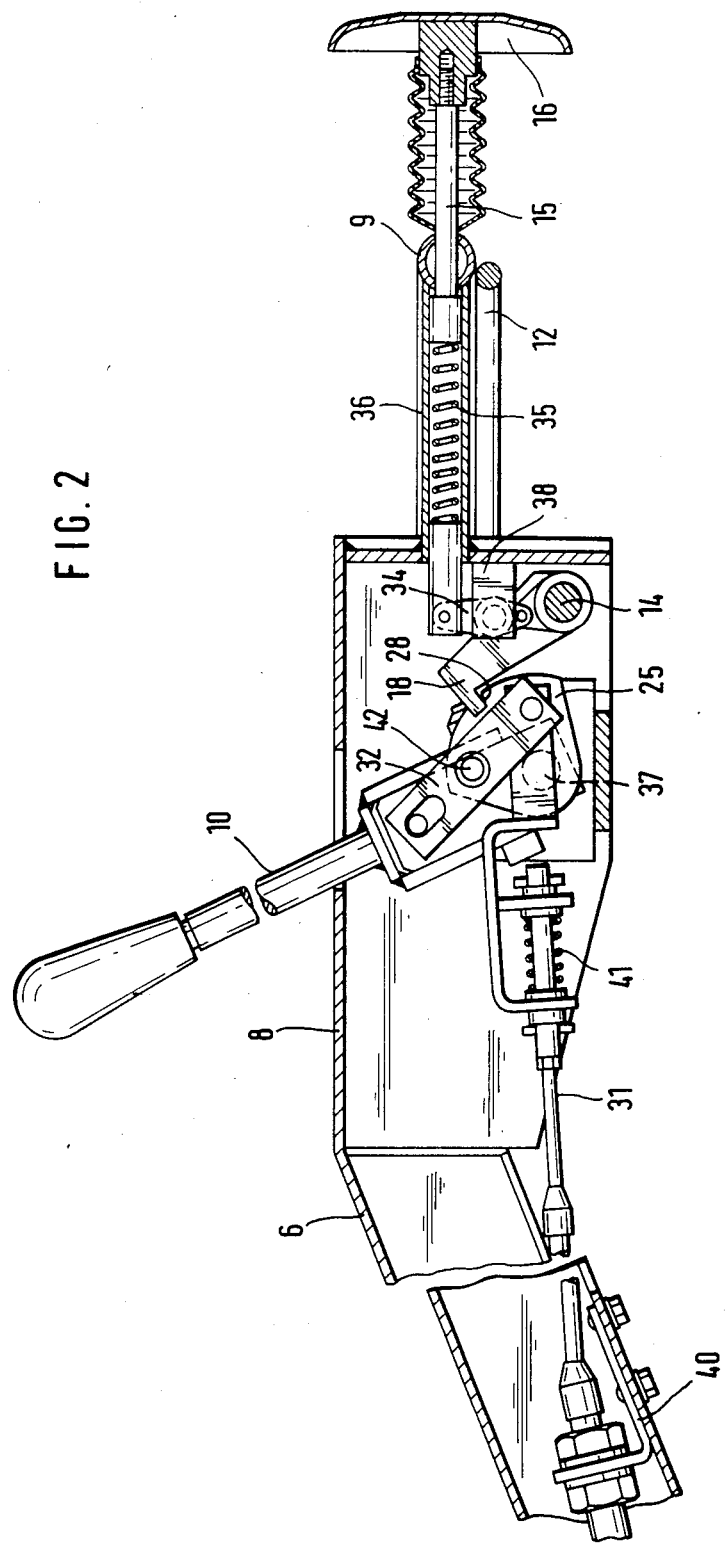

DOUBLE-SAFETY ARRANGEMENT FOR A SELF-PROPELLED HAND-GUIDED MACHINE

FIELD OF THE INVENTION

The invention relates to a double-safety arrangement for a self-propelled hand-guided machine such as a duplex vibratory roller or the like equipped with a control column for the operator of the machine. A latchable operating lever is mounted on the control column and has a neutral central position and at least a position for forward travel and a position for rearward travel.

BACKGROUND OF THE INVENTION

Machines of this kind constitute a substantial danger for their environment and especially for persons because of their great weight and their self-propelled capability. The operator of the machine is especially in danger because the machine is hand-guided. For example, when the machine is traveling in a rearward direction, the operator can easily be caught beneath the machine by stumbling or falling.

For the above reasons, safety measures have to be taken with respect to the machine which can prevent any undesired movement of the machine and preclude a continuation of travel in the presence of irregularities especially as they apply to the operator.

In view of the foregoing considerations, which have already led to regulations in various countries, it is necessary that a self-propelled, hand-guided machine of this kind be equipped with a deadman's handle and appropriate safety measures with respect to rearward travel thereof.

SUMMARY OF THE INVENTION

It is an object of the invention to provide an especially desirable configuration of a safety arrangement on a machine of the above-mentioned type by means of which it is possible to bring the machine to a halt in response to all irregularities with respect to the machine operator. This is especially the situation with respect to rearward travel of the machine to ensure the safety of the operator against all possible danger for this condition.

According to a feature of the invention, the double safety arrangement includes a deadman's handle on the control column which must be actuated in order to engage the machine in a driving position and held in the actuated position to maintain traveling operation. The double safety arrangement further includes a shutoff member which is pushable in the direction toward the control column and which, when struck, interrupts drive movement even though the machine is in its travel position and the deadman's handle is actuated.

With the switching arrangement of the invention wherein the deadman's handle must be actuated in order to shift the machine into a travel position, it is ensured that after an interruption of the travel operation caused by releasing the deadman's handle, the machine can again be set in motion only by means of a predetermined sequence of operator movements whereby first the operating lever has to be placed in its neutral position whereafter the deadman's handle has to be actuated and only then can the operating lever be moved to the desired position for forward or rearward travel.

On the other hand, with the configuration of the invention, an interruption of the travel operation can, for example, also be achieved if the operator stumbles and falls during the rearward travel of the machine and still holds the bail handle tightly while at the same time actuating the deadman's handle. This interruption is achieved by the configuration of the shutoff member as a push-in member arranged at the end of the control column and by means of its override control characteristic. As soon as the operator presses the shutoff member with the body even if only in a passing movement, the machine will come to a standstill. The same is true if the machine operator guides the machine to the side and, because of a lack of attention, the latter comes into contact engagement with a stationary object. In this situation also, damage to the object is prevented by overriding the deadman's handle by means of the shutoff member. In this way, the configuration of the double safety arrangement according to the invention provides increased safety for various trouble situations.

An especially advantageous embodiment of the double safety arrangement of the invention is in the provision that the shutoff member and the deadman's handle act upon a latching arrangement in a transmission rod disposed between the operating lever and a switching shaft for the drive mechanism of the machine whereby a return positioning arrangement is provided for the switching shaft in a neutral center position wherein the machine drive is disengaged, the switching shaft being unlatched from the operating lever. The return positioning arrangement for the switching shaft can for example include two spring-loaded jaws which engage parallel sides of the switching shaft. In the neutral center position, the jaws should be completely in contact engagement with two flanks of the switching shaft. If the travel position is engaged with the operating lever, a rotation of the switching shaft by a predetermined amount is to be generated by means of a corresponding translation of the transmission shaft whereby the jaws are spread apart by the force of a spring. As soon as the latching of the operating lever and the switching shaft is released, the jaws effect an automatic return rotation of the switching shaft to the starting position until the jaws are again placed in contact engagement with the flanks of the switching shaft.

However, still other configurations of the return positioning arrangement are possible whereby a further embodiment can include the provision that by means of a rotation of the switching shaft, a torsion spring connected to the latter is rotated or two helical springs having pitches opposed to each other are arranged on the shaft and are spread in mutually opposite directions.

In an especially desirable embodiment, the latching assembly can include a carrier plate which is rotatably journalled on a stationary shaft and which can be latched to prevent rotation thereof. The latching assembly further includes a translating lever eccentrically journalled on the carrier plate on an axis parallel to the stationary shaft. The translating lever is engaged by the operating lever on the one hand and, by the part of the transmission rod connected to the switching shaft on the other hand, whereby an unlatching occurs by means of releasing the deadman's handle or by means of actuating the shutoff member. In this connection, the latter is especially then possible if the deadman's handle remains actuated. On the other hand, a renewed latching by means of actuating the deadman's handle is only then possible if the operating lever is first placed in its neutral center position after the switching shaft is returned to its neutral central position. This return to the neutral center position occurs automatically after an unlatching.

As long as the carrier plate is latched against rotation, the rotational axis of the translating lever acts as a stationary bearing point. Independently of whether the translating lever is configured as a one-arm lever or a two-arm lever, every displacement of the operating lever is transmitted to the position of the switching shaft. As soon as the carrier plate is unlatched, the bearing point for the translating lever is displaceable in a plane parallel to the plane of movement of the operating lever and to the plane of the translating lever. In so far as the operating lever is disposed in a travel position and is latched in this position, the point at which the operating lever acts upon the translating lever is determined. The translating lever can freely rotate about this point when its point of engagement for the translating lever is displaced into the neutral center position by the return positioning of the switching shaft.

According to the invention, a renewed latching is only then possible when the operating lever is returned to the neutral center position. For this purpose, the carrier plate is preferably provided with a notch at its periphery and arranged so that it faces toward a detent precisely when the operating lever and the switching shaft are each in their neutral central position. The position of the point of engagement on the translating lever is determined by means of these positions and so also the position of the bearing location between the translating lever and the carrier plate. The location of the bearing position determines the angular position of the carrier plate.

Further details are directed to the arrangement and configuration of the detent as well as its connection with the deadman's handle and the shutoff member. The detent is journalled on a shaft which is rotatable by actuating the deadman's handle. With this action, the rotational movement of the shaft is transmitted to the detent in the form of a pivotal movement of the latter whereby a relative movement between the detent and the shaft is possible against the force of a spring. With the actuation of the deadman's handle, the detent moves toward the carrier plate and into the notch formed thereon especially for the center positions. Further, the shutoff member acts upon the detent in the sense that a pushing in of the shutoff member causes a pivot movement of the detent against the force of the previously mentioned spring away from the carrier plate and out of the notch.

BRIEF DESCRIPTION OF THE DRAWING

The invention will now be described with reference to the drawing wherein:

FIG. 2 is a vertical section view taken through the control head of the control column showing parts of the double safety arrangement;

DESCRIPTION OF THE PREFERRED EMBODIMENTS OF THE INVENTION

Figure 1:
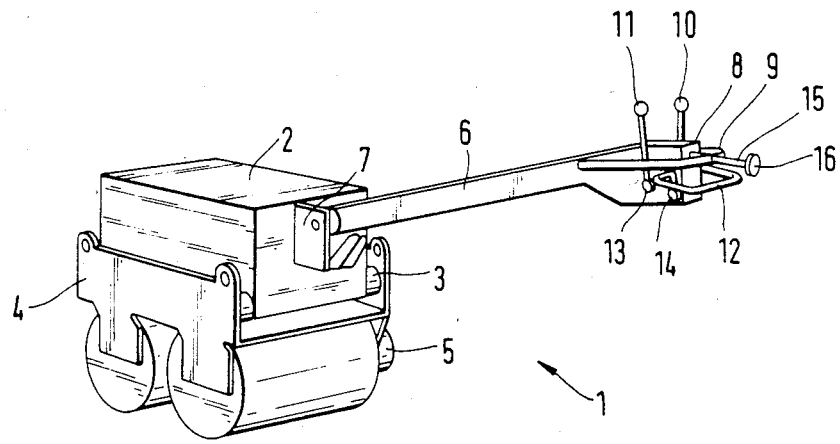
FIG. 1 is a perspective view of a duplex vibratory roller equipped with the double safety arrangement according to the invention.

FIG. 1 illustrates a self-propelled, hand-guided machine in the form of a duplex vibratory roller 1 having a motor housing 2 which is held by a resilient suspension 3 in a chassis 4. Parts of the roller drive 5 are shown to the right and include a control column 6 mounted in a bearing bracket 7 on the machine housing 2. A bail handle 9 is mounted on the control head 8 for controlling the vibratory rollers as well as for protecting the operating levers 10 and 11. A bail-like deadman's handle 12 is located beneath the bail handle 9 so as to be parallel thereto. The deadman's handle 12 has respective ends mounted to a shaft 14. The operating lever 11 is mounted on a shaft 13 parallel to the shaft 14. The shaft for operating lever 10 is likewise parallel to shaft 14 and is not visible in this view. The shutoff member 15 is disposed at the end of the control head 8 and is arranged so as to project outwardly beyond and through the bail handle 9. The rearward outward end of the shutoff member 15 is provided with an abutment plate 16. The deadman's handle and the shutoff member 15 are shown in their rest positions from which the deadman's handle 12 is pivotally movable against the force of a spring and the shutoff member 15 is movable against the force of a spring by means of a push-in movement.

FIG. 2 shows a portion of the control column 6 and the control head 8 in section. The shutoff member 15 extends through the bail handle 9 and abutment plate 16 is mounted at the end of the shutoff member 15. The shutoff member 15 includes a guide tube 36 arranged between the bail handle 9 and the control head 8 for accommodating a telescopic spring 35. The shutoff member 15 is shown in its rest position with the spring 35 relaxed whereas, the deadman's handle 12 is shown in its operating position wherein the spring thereof is loaded. The shaft 14 is journalled within the control head 8 and is fixedly connected to the deadman's handle 12. The detent unit 18 is mounted on the shaft 14.

Further, a shaft 37 is journalled in the control head 8 on which the carrier plate 25 is pivotally mounted. The translating lever 32 is pivotally mounted on the carrier plate 25 by means of a bearing bolt 42. Further, the transmission rod 31 extends from the operating lever 10 to a switching shaft not shown. When the deadman's handle 12 is pulled upwardly toward the bail handle 9, the shaft 14 with its detent unit 18 is rotated to the left in the counterclockwise direction so that the detent unit 18 engages the notch 28 formed in the carrier plate 25. In this way, the shaft 14 and the detent unit 18 are connected to each other in a form-tight manner via a spring 33 (FIG. 4).

A two-arm lever 34 acts upon detent unit 18 with its lower outer end. The two-arm lever 34 is pivotally mounted in a bearing block 38 and its other outer end is connected to the shutoff member 15. By pushing the shutoff member 15 inwardly against the force of the spring 35, the two-arm lever 34 is rotated to the left in the counterclockwise direction so that the detent unit 18 is rotated in the clockwise direction about its axis whereby the latching assembly becomes unlatched. Further details which are shown in FIG. 2 include bearing bracket 40 for the transmission rod 31 as well as a resilient member 41 arranged in the transmission rod 31 leading to the switching shaft of the machine.

Figure 3:
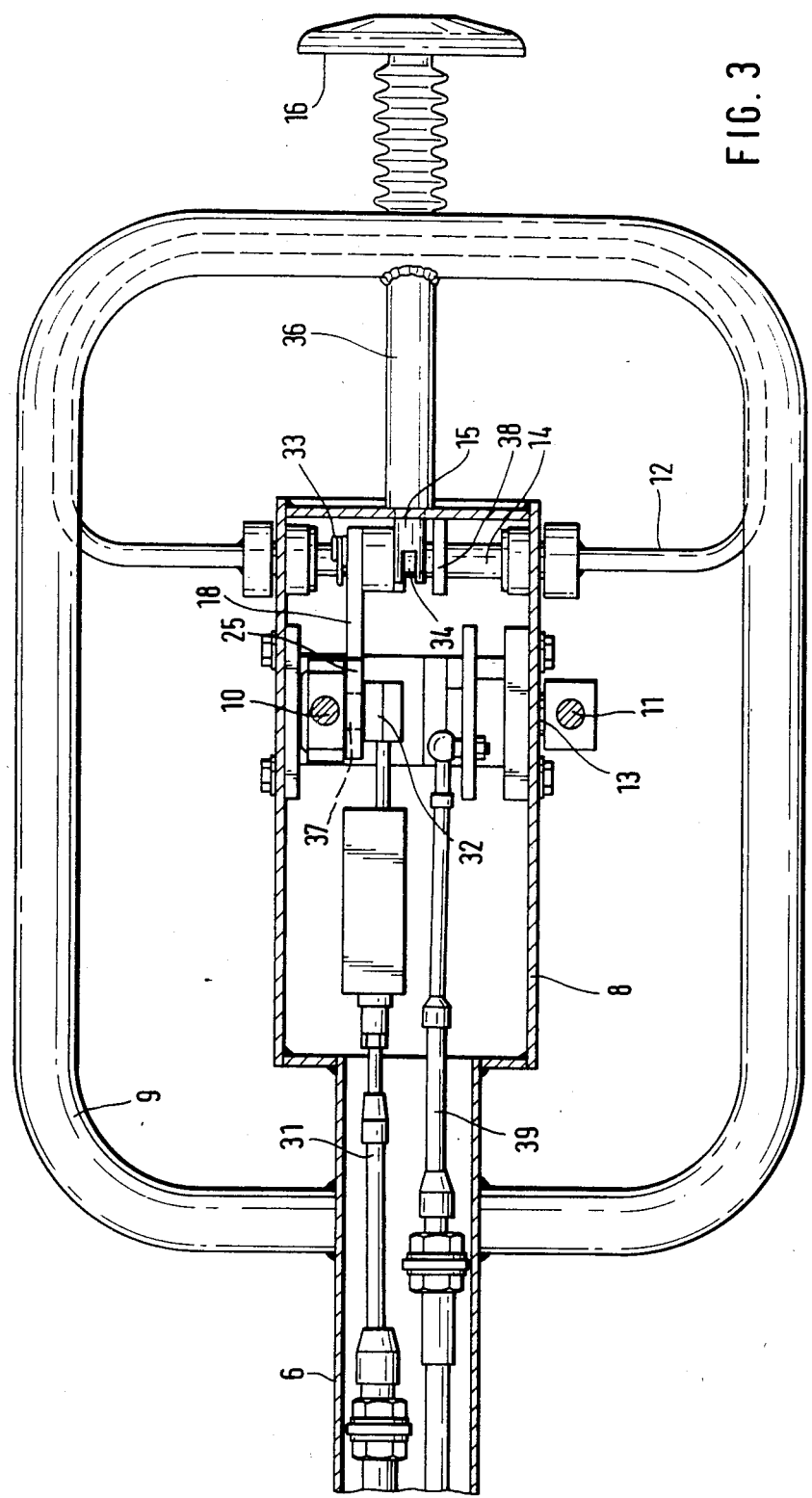
FIG. 3 is a horizontal section taken through the control head showing a plan view of the double safety arrangement.

FIG. 3 shows the bail handle 9 mounted on the control column 6 and the deadman's handle 12 mounted directly on the control head 8. The guide tube 36 for the shutoff member 15 equipped with abutment plate 16 is disposed between the control head 8 and the bail handle 9. The end of the shutoff member 15 disposed in the control head 8 is bifurcated to accommodate one end of the two-arm lever 34. The detent unit 18 is rotatably journalled on the shaft 14 of the deadman's handle 12 and is connected with the shaft 14 by means of a helical spring 33. The detent unit 18 engages the carrier plate 25 which is rotatably journalled on the shaft 37. The operating lever 10 is likewise rotatably journalled on shaft 37. Further, the translating lever 32 as well as the transmission rod 31 are shown in FIG. 3. The operating lever 11 mounted on shaft 13 is connected with the transmission rod 39 and has no functional relationship to the details mentioned above.

Figure 4:
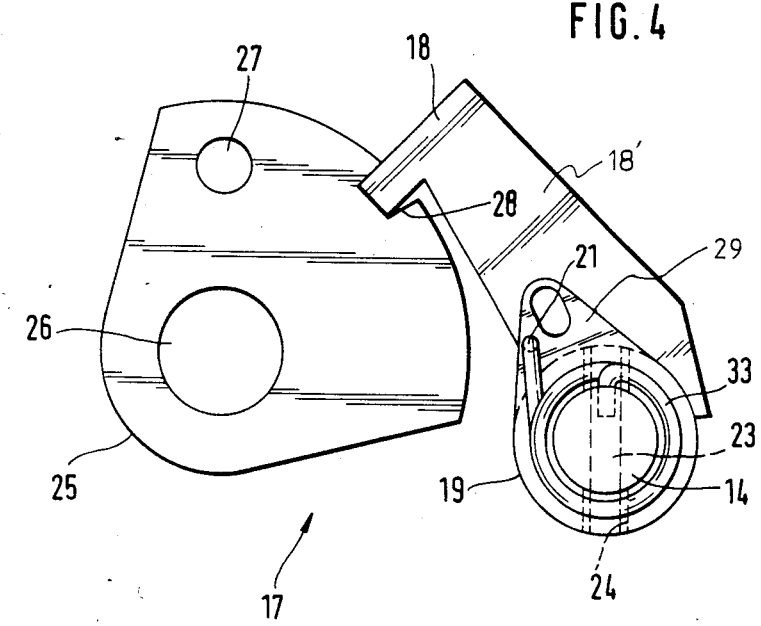
FIG. 4 is a side elevation view of the latching assembly of the double safety arrangement.

FIG. 4 illustrates the parts of the latching assembly 17 including the detent unit 18 and the carrier plate 25. The detent unit 18 engages a notch 28 formed in the periphery of the carrier plate 25. The carrier plate 25 includes a bore 26 for receiving the shaft 37 as well as a bore 27 for receiving the bearing stud 42 (FIG. 7) of the translating lever 32. The detent unit 18 includes a bushing 19 which is rotatable with respect to shaft 14 by a limited amount. A helical spring 33 engages an aperture 21 of the detent unit 18 on the one hand and, a bore in the shaft 14 on the other hand. A key 23 penetrates the shaft 14 as well as an elongated bore 24 extending through the bushing 19. In this way, a relative movement between detent unit 18 and the shaft 14 is possible.

Figure 6:
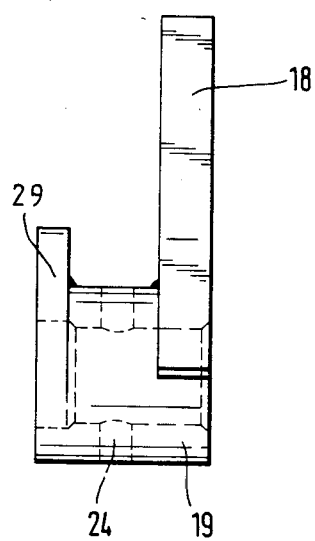
FIG. 6 is a front elevation view of the detent unit.
Figure 5:
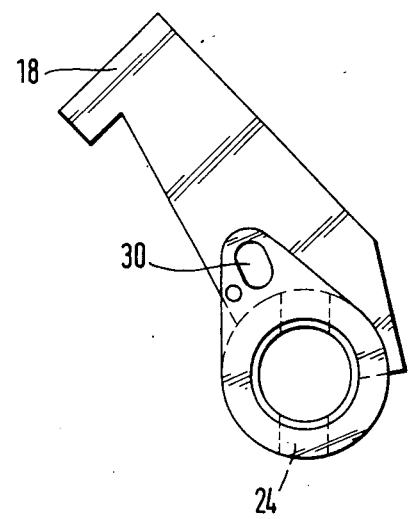
FIG. 5 is a side elevation view of the detent unit.

FIGS. 5 and 6 show that the bushing 19 carries a cam-like flange 29 next to the detent arm 18'. The flange 29 has a slot 30 formed therein whereat the two-arm lever 34 is pivotally connected to the detent unit 18. The configuration of the bore 24 through bushing 19 is also shown in FIGS. 5 and 6.

From FIGS. 4 to 6, it is apparent that a rotation of shaft 14 in the counterclockwise direction as a consequence of pulling upwardly on the deadman's handle 12 effects a pivotal movement of the detent unit 18 via spring 33. At the same time, the flange 29 moves to the left in a counterclockwise direction so that the opposite end of the two-arm lever 34, which is pivotally connected to the shutoff member 15, is displaced toward the right. This causes the telescopic spring 35 of the shutoff member 15 to become partially loaded so that when the deadman's handle 12 is released, a movement occurs in the opposite direction.

This movement in the opposite direction can, however, also be effected if the shaft 14 is held in the position by a continued actuation of the deadman's handle 12. For this it is required that the flange 29 be forcibly rotated in the clockwise direction thereby tensioning the spring 33. The forcible rotation of the flange 29 can result from a push-in movement of the shutoff member 15 whereby the upper end of the two-arm lever 34 moves to the left and the lower end connected to the aperture of the flange 29 moves to the right.

Figure 7:
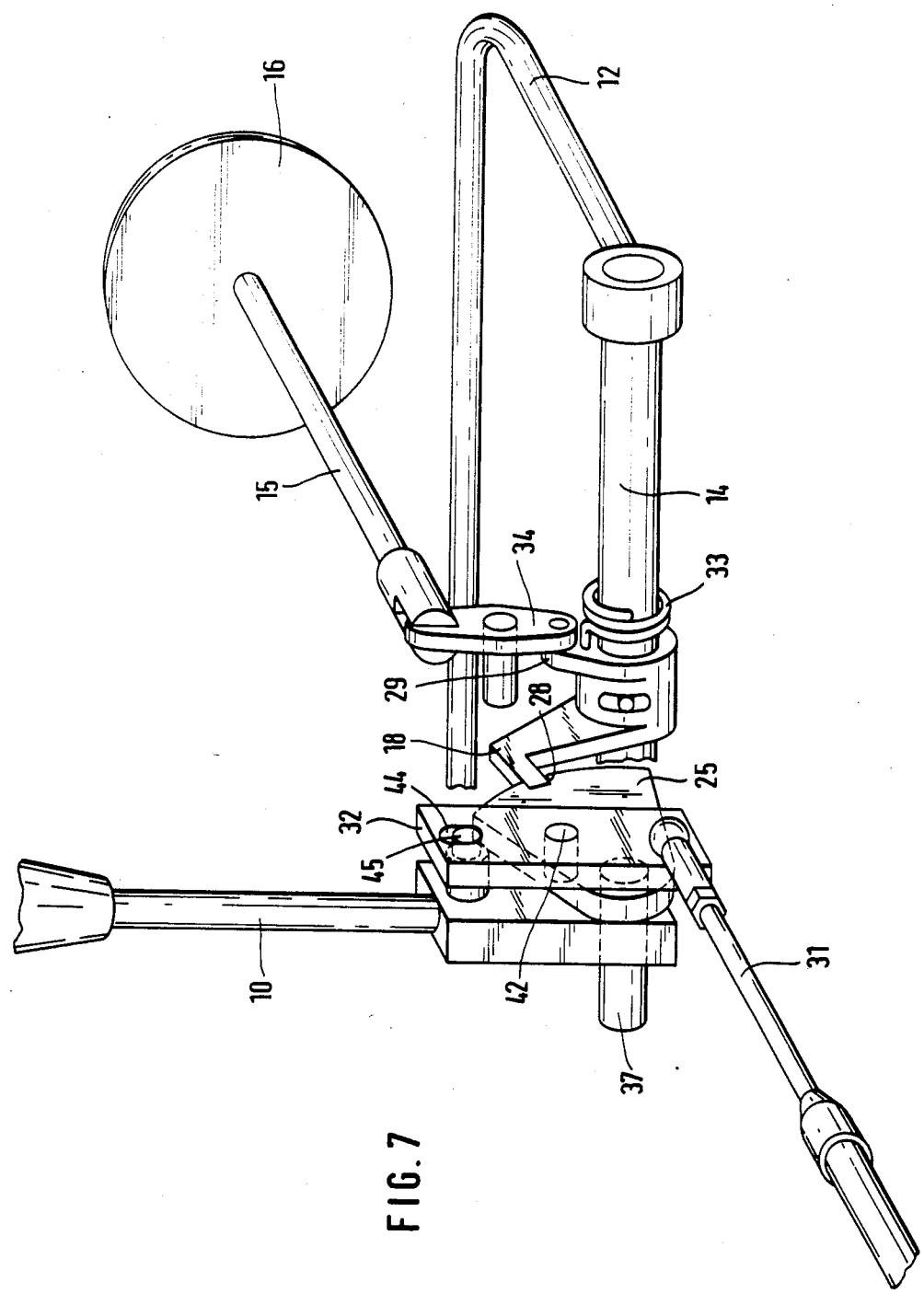
FIG. 7 is a perspective view showing parts of the latching assembly.

FIG. 7 is a perspective view of the double safety arrangement of the invention wherein several details shown in FIGS. 1 to 6 have been modified; however, the view serves to show how the two shutoff mechanisms coact.

When the deadman's handle 12 is actuated, the shaft 14 connected with the handle 12 causes the detent unit 18 to be rotated to the left therewith by means of the connecting spring 33 and is brought thereby into engagement with notch 28 of the carrier plate 25. As a consequence, the shutoff member 15 with its abutment plate 16 is moved against the force of a weaker spring (not shown in FIG. 7) by means of the connection of the flange 29 to the two-arm lever 34 so that it is difficult for the deadman's handle 12 to return to its initial position. As long as the detent unit 18 and the carrier plate 25 are latched, the position of the plate 25 on the shaft 37 is fixed so that the bearing stud 42 between carrier plate 25 and the translating lever 32 is likewise fixed. The operating lever 10 is also journalled on shaft 37 and in this way every change of position of the operating lever 10 is transmitted to the switching rod 31 via the take-along stud 45 which slideably engages slot 44 and via the translating lever 32.

Starting with the position of the shutoff member 15 shown in FIG. 7, if the shutoff member 15 is pushed forwardly to the left against the force of telescopic spring 35 (FIG. 2), the detent unit 18 is rotated rearwardly to the right in the counterclockwise direction on the shaft 14 by means of the two-arm lever 34 and the flange 29 thereby tensioning spring 33, the shaft 14 continuing to be held in its position shown in FIG. 7. As soon as the detent unit 18 in this way releases the carrier plate 25 on its shaft 37, the translating lever 32 is independent of the position of the operating lever 10 and is free to move on the take-along stud 45 so that the transmission rod 31 can be returned to its neutral position.

The coaction of the parts is caused by the fact that only the common shaft for the operating lever and the carrier plate is continuously held in a fixed position and that the carrier plate can be latched against rotation by the engagement therewith of the detent unit 18 in the notch 28.

It is understood that the foregoing description is that of the preferred embodiments of the invention and that various changes and modifications may be made thereto without departing from the spirit and scope of the invention as defined in the appended claims.

What is claimed is:

1. A double-safety arrangement for a self-propelled, hand-guided machine such as a duplex-vibratory roller equipped with a control column for facilitating control of the machine by an operator, the machine being further equipped with switching linkage means actuable for engaging the machine for forward and rearward travel and having a neutral position to which said linkage means returns when no longer actuated for said travel and whereat the machine is disengaged and comes to a halt, the double-safety arrangement comprising:

an operating lever having a center neutral position and at least first and second travel positions for forward and rearward travel, respectively; and, a latching assembly movable into a latched condition for transmitting the movements of said lever to said linkage means thereby actuating the latter and into an unlatched condition whereat said linkage means is no longer actuable by said lever;

said latching assembly including:

connecting means movable between a first position for mechanically connecting said operating lever to said linkage means for transmitting said lever movements thereto and a second position whereat said lever movements are no longer transmittable to said linkage means;

deadman's handle means movable to an actuating position for holding said connecting means in said first position so long as said handle means is held in the actuated position thereof by the operator; and, override shutoff means for acting on said connecting means while the same is in said first position thereof to cause the latter to move into said second position thereby interrupting the connection between said lever and said linkage means and causing the latter to return to its neutral position whereat the machine is disengaged and comes to a halt.

2. The double-safety arrangement of claim 1, wherein the control column includes frame means for accommodating said latching assembly therein, said connecting means including: a first shaft fixedly mounted in said frame; a carrier plate rotatably journalled on said shaft; and, a translating lever mounted on said carrier plate so as to pivot about an axis eccentric and parallel to the axis of said shaft; said translating lever being connected to said operating lever and said switching linkage means;

said deadman's handle means including a deadman's handle mounted in said frame means so as to be movable between a released position and said actuating position; and, detent means operatively connected to said handle for engaging and latching said carrier plate when said handle is in said actuated position thereby holding said connecting means in said first position so long as said handle is held in said actuated position; and, said override shutoff means including a shutoff member manually actuable by the operator and movably mounted on said frame means for acting on said detent means to unlatch said carrier plate while said handle is in said actuated position.

3. The double-safety arrangement of claim 2, said detent means including a notch formed in the peripheral edge of said carrier plate; and, a detent connected to said handle and pivotally mounted in said frame means so as to be disposed directly adjacent said peripheral edge of said carrier plate; said notch and said detent being arranged to have the same angular position with respect to said first shaft when said operating lever and said switching linkage means are in said neutral positions thereof, respectively, to permit latching engagement of said carrier plate when said handle is moved to said actuated position thereof.

4. The double-safety arrangement of claim 3, said deadman's handle means further including a second shaft mounted in said frame means and connected to said handle so as to be rotatable thereby when the latter is pivoted to said actuated position; said detent being mounted on said second shaft; and, a first spring interposed between said detent and said second shaft so as to become stressed when said handle is moved to said actuated position; said override shutoff means including linkage means for connecting said shutoff member to said detent for acting thereon in response to a manual actuation of said shutoff member by the operator, said last-mentioned linkage means being connected to said detent at a location eccentric of the rotational axis of said second shaft.

5. The double-safety arrangement of claim 4, said last-mentioned linkage means including a two-arm lever pivotally mounted on said frame means for connecting said shutoff member to said detent.

6. The double-safety arrangement of claim 5, said shutoff member being mounted on said frame means so as to be movable between an inactive position and an active position whereat said shutoff member acts upon said detent, said override shutoff means including a spring for resiliently biasing said shutoff member into said inactive position.

7. The double-safety arrangement of claim 6, said shutoff member being an elongated member and having an end facing toward the operator, said override shutoff means including an abutment plate mounted on said end of said shutoff member facing the operator.

8. The double-safety arrangement of claim 6, said frame means including a further handle for the operator mounted so as to be fixed in position with respect to the control column, said shutoff member being mounted on said further handle so as to pass therethrough.

9. The double-safety arrangement of claim 2, said translating lever being a two-arm lever, one arm of said two-arm lever being pivotally connected to said operating lever; and, the other arm of said two-arm lever being pivotally connected to said switching linkage means.

10. The double-safety arrangement of claim 9, said connecting means including a slot formed in one of said one arm of said translating lever and said operating lever and a take-along pin formed on the other one of said one arm of said translating lever and said operating lever for slideably engaging said slot.

11. The double-safety arrangement of claim 10, said operating lever and said carrier plate both being pivotally mounted on said first shaft.

12. The double-safety arrangement of claim 2, said translating lever being a one-arm lever for connecting said operating lever with linkage means.

13. The double-safety arrangement of claim 2, said operating lever being connected to said translating lever as a single piece.

14. The double-safety arrangement of claim 8, said deadman's handle being disposed directly beneath and parallel to said further handle, said deadman's handle being configured so as to permit two-handed operation of said deadman's handle by the operator.

* * * * *